(12) United States Patent
Han et al.

(10) Patent No.: US 12,449,908 B2
(45) Date of Patent: Oct. 21, 2025

(54) AUGMENTED REALITY DEVICE, AND METHOD FOR CONTROLLING AUGMENTED REALITY DEVICE

(71) Applicant: SAMSUNG ELECTRONICS CO., LTD., Suwon-si (KR)

(72) Inventors: Insun Han, Suwon-si (KR); Doil Kwon, Suwon-si (KR); Jiin Kim, Suwon-si (KR); Jaemin Chun, Suwon-si (KR); Minseok Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 18/204,116

(22) Filed: May 31, 2023

(65) Prior Publication Data

US 2023/0305635 A1    Sep. 28, 2023

Related U.S. Application Data

(63) Continuation of application No. PCT/KR2021/019813, filed on Dec. 24, 2021.

(30) Foreign Application Priority Data

Dec. 31, 2020  (KR) .................. 10-2020-0189713

(51) Int. Cl.
*G06F 3/01*     (2006.01)
*G06F 3/04847*  (2022.01)
(Continued)

(52) U.S. Cl.
CPC .......... *G06F 3/017* (2013.01); *G06F 3/04847* (2013.01); *G06T 11/00* (2013.01);
(Continued)

(58) Field of Classification Search
None
See application file for complete search history.

(56) References Cited

U.S. PATENT DOCUMENTS 9,377,863 B2   6/2016  Bychkov et al.
9,710,068 B2   7/2017  Yoo et al.
(Continued)

FOREIGN PATENT DOCUMENTS

KR   10-1815020 B1   1/2018
KR   10-2003493 B1   7/2019
(Continued)

OTHER PUBLICATIONS

Commuication dated Mar. 12, 2024, issued by the European Patent Office in European Application No. 21915686.6.
(Continued)

*Primary Examiner* — Christopher J Fibbi
(74) *Attorney, Agent, or Firm* — Sughrue Mion, PLLC

(57) ABSTRACT

An augmented reality (AR) device includes: an eye tracking sensor configured to obtain gaze information of a user; a communication interface; a camera; a display engine; a display; a memory storing one or more instructions; and a processor configured to execute the one or more instructions to: transmit, through the communication interface, gaze coordinates corresponding to a real-world object based on the gaze information to an image processing device that displays the real-world object, recognize, based on an image captured through the camera, a gesture to call a virtual image of the real-world object specified in the image processing device according to screen coordinates corresponding to the gaze coordinates, receive, through the communication interface, object information of the specified real-world object from the image processing device in response to transmitting an event notification corresponding to the recognized gesture to the image processing device, and control the display
(Continued)

engine to provide a virtual image corresponding to the object information among prepared virtual images to a depth layer of the display corresponding to a type of the specified real-world object.

16 Claims, 9 Drawing Sheets

(51) Int. Cl.
   *G06T 11/00* (2006.01)
   *G06V 20/20* (2022.01)
   *G06V 40/20* (2022.01)
(52) U.S. Cl.
   CPC .............. *G06V 20/20* (2022.01); *G06V 40/28* (2022.01); *G06F 3/013* (2013.01); *G06T 2200/24* (2013.01)

(56) References Cited

U.S. PATENT DOCUMENTS

| | | | |
|---|---|---|---|
| 9,791,921 B2* | 10/2017 | Poulos | G06F 3/013 |
| 11,106,915 B1* | 8/2021 | Nagar | G06F 16/29 |
| 2011/0093778 A1 | 4/2011 | Kim et al. | |
| 2013/0154913 A1 | 6/2013 | Gene et al. | |
| 2014/0167929 A1 | 6/2014 | Shim et al. | |
| 2014/0237366 A1* | 8/2014 | Poulos | G06F 3/013 |
| | | | 715/728 |
| 2015/0054743 A1* | 2/2015 | Orhand | G06F 3/0488 |
| | | | 345/158 |
| 2015/0062161 A1 | 3/2015 | Kim et al. | |
| 2019/0011979 A1 | 1/2019 | Faaborg et al. | |
| 2019/0377474 A1 | 12/2019 | Neeter | |
| 2019/0384389 A1 | 12/2019 | Kim et al. | |
| 2019/0392640 A1* | 12/2019 | Qian | G06F 3/013 |
| 2020/0326783 A1 | 10/2020 | Kwon et al. | |
| 2020/0371673 A1 | 11/2020 | Faulkner | |
| 2021/0004146 A1* | 1/2021 | Linville | G06F 3/0304 |
| 2021/0333883 A1* | 10/2021 | Stafford | A63F 13/26 |
| 2022/0100270 A1* | 3/2022 | Pastrana Vicente | G06F 3/013 |
| 2024/0291685 A1* | 8/2024 | Hu | G06V 10/75 |

FOREIGN PATENT DOCUMENTS

| | | |
|---|---|---|
| KR | 10-2019-0103094 A | 9/2019 |
| KR | 10-2019-0128962 A | 11/2019 |
| KR | 10-2062580 B1 | 2/2020 |
| KR | 10-2020-0120467 A | 10/2020 |
| KR | 10-2165444 B1 | 10/2020 |

OTHER PUBLICATIONS

International Search Report and Written Opinion (PCT/ISA/210 and PCT/ISA/237) issued Mar. 25, 2022 by the International Searching Authority in International Application No. PCT/KR2021/019813.

* cited by examiner

FIG. 4
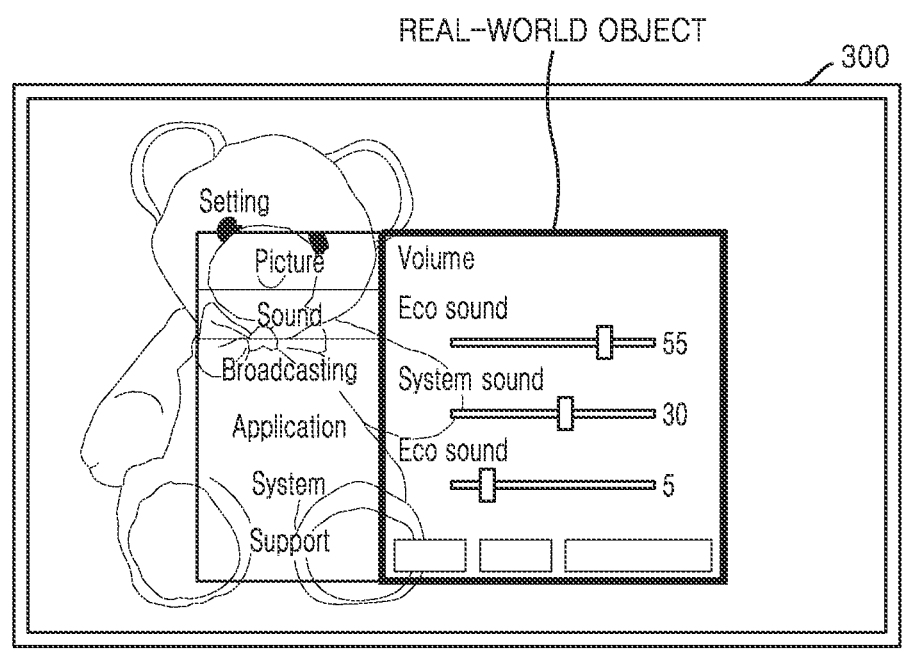
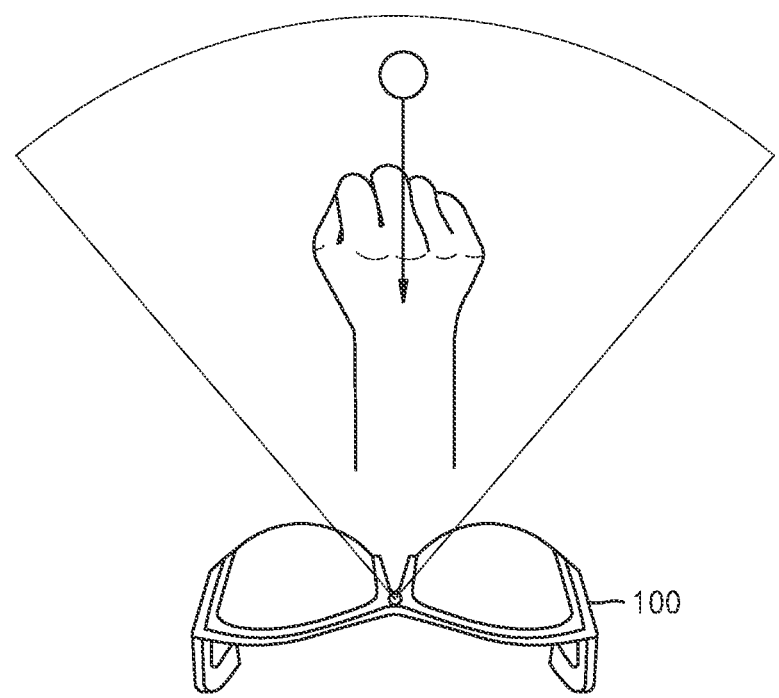

AUGMENTED REALITY DEVICE, AND METHOD FOR CONTROLLING AUGMENTED REALITY DEVICE

CROSS-REFERENCE TO RELATED APPLICATIONS

This application is a bypass continuation of PCT International Application No. PCT/KR2021/019813, which was filed on Dec. 24, 2021, and claims priority to Korean Patent Application No. 10-2020-0189713, filed on Dec. 31, 2020, in the Korean Intellectual Property Office, the disclosures of which are incorporated herein by reference in their entireties.

BACKGROUND

1. Field

The disclosure relates to an augmented reality (AR) device, and a method of controlling the AR device.

2. Description of Related Art

Augmented reality (AR) is a technology that projects a virtual image onto a physical environment space or a real-world object in the real world and displays the same as a single image.

An AR device, while worn on a user's face or head, allows a user to see a real scene and a virtual image together through a pop-up of the virtual image in the form of a projection, placed in front of the user's eyes.

SUMMARY

Provided are an augmented reality (AR) device that provides a virtual image of a real-world object displayed on an image processing device through interaction with the image processing device, and a method of controlling the AR device. The AR device may be configured to perform said method.

According to an aspect of the disclosure, an augmented reality (AR) device includes: an eye tracking sensor configured to obtain gaze information of a user; a communication interface; a camera; a display engine; a display; a memory storing one or more instructions; and a processor configured to execute the one or more instructions to: transmit, through the communication interface, gaze coordinates corresponding to a real-world object based on the gaze information to an image processing device that displays the real-world object, recognize, based on an image captured through the camera, a gesture to call a virtual image of the real-world object specified in the image processing device according to screen coordinates corresponding to the gaze coordinates, receive, through the communication interface, object information of the specified real-world object from the image processing device in response to transmitting an event notification corresponding to the recognized gesture to the image processing device, and control the display engine to provide a virtual image corresponding to the object information among prepared virtual images to a depth layer of the display corresponding to a type of the specified real-world object.

The processor may be further configured to execute the one or more instructions to, based on types of the specified real-world objects being different from each other, provide virtual images of specified real-world objects to different depth layers of the display.

The processor may be further configured to execute the one or more instructions to provide a first virtual image of a first-type real-world object to a first depth layer of the display and provide a second virtual image of a second-type real-world object to a second depth layer of the display.

The first depth layer of the display may display a pop-up of a virtual image so as to be observed at a closer position than the second depth layer of the display.

The processor may be further configured to execute the one or more instructions to: based on the specified real-world object being the setting user interface, provide a virtual image of a setting user interface to a first depth layer of the display, and based on the specified real-world object being media content, provide a virtual image of the media content to a second depth layer of the display.

The object information may include identification information of the specified real-world object and data information, and the processor may be further configured to execute the one or more instructions to control the display engine to reflect the data information in a virtual image corresponding to the identification information among the prepared virtual images and provide the virtual image to the depth layer of the display.

The prepared virtual images may be received from a server through the communication interface when the AR device is communicably connected to the server that relays between the AR device and the image processing device.

The processor may be further configured to execute the one or more instructions to, based on a certain hand pose being detected in a hovered state of the specified real-world object, recognize a gesture to call the virtual image, based on the image captured through the camera.

The processor may be further configured to execute the one or more instructions to recognize a gesture to manipulate a pop-up of the provided virtual image based on the image captured through the camera and transmit object information changed by the manipulation to the image processing device through the communication interface.

The display may include a plurality of depth layers where a pop-up of the virtual image is observed at different positions.

According to an aspect of the disclosure, a method of controlling an augmented reality (AR) device, includes: transmitting gaze coordinates corresponding to a real-world object to an image processing device that displays the real-world object; recognizing a gesture to call a virtual image of the real-world object specified in the image processing device according to screen coordinates corresponding to the gaze coordinates; receiving object information of the specified real-world object from the image processing device in response to transmitting an event notification corresponding to the recognized gesture to the image processing device; and providing a virtual image corresponding to the object information among prepared virtual images to a depth layer corresponding to a type of the specified real-world object.

The providing the virtual image corresponding to the object information may include, based on types of the specified real-world objects are being different from each other, providing a plurality of virtual images to different depth layers.

The providing the virtual image corresponding to the object information may include: based on the specified real-world object being a setting user interface, providing a virtual image of the setting user interface to a first depth layer; and based on the specified real-world object being media content, providing a virtual image of the media content to a second depth layer.

The object information may include identification information of the specified real-world object and data information, and the providing the virtual image corresponding to the object information may include reflecting the data information in a virtual image corresponding to the identification information among the prepared virtual images and providing the virtual image to the depth layer.

The method may further include recognizing, based on the image captured through a camera, at least one of a gesture to call the virtual image, based on a certain hand pose being detected in a hovered state of the specified real-world object, and a gesture to manipulate a pop-up of the provided virtual image; and transmitting object information changed by the manipulation to the image processing device.

According to an aspect of the disclosure, a non-transitory computer-readable recording medium for storing computer readable program code or instructions which are executable by a processor to perform a method, the method including: transmitting gaze coordinates corresponding to a real-world object to an image processing device that displays the real-world object; recognizing a gesture to call a virtual image of the real-world object specified in the image processing device according to screen coordinates corresponding to the gaze coordinates; receiving object information of the specified real-world object from the image processing device in response to transmitting an event notification corresponding to the recognized gesture to the image processing device; and providing a virtual image corresponding to the object information among prepared virtual images to a depth layer corresponding to a type of the specified real-world object.

The providing the virtual image corresponding to the object information may include, based on a type of at least a first specified real-world object being different from a type of at least a second specified real-world object, providing a plurality of virtual images to different depth layers.

The providing the virtual image corresponding to the object information may include: based on the specified real-world object being a setting user interface, providing a virtual image of the setting user interface to a first depth layer; and based on the specified real-world object being media content, providing a virtual image of the media content to a second depth layer.

The object information may include identification information of the specified real-world object and data information, and the providing the virtual image corresponding to the object information may include reflecting the data information in a virtual image corresponding to the identification information among the prepared virtual images and providing the virtual image to the depth layer.

The method further may include: recognizing, based on the image captured through a camera, at least one of a gesture to call the virtual image, based on a certain hand pose being detected in a hovered state of the specified real-world object, and a gesture to manipulate a pop-up of the provided virtual image; and transmitting object information changed by the manipulation to the image processing device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a view illustrating a state where an AR device recognizes a gesture that calls a virtual image of a real-world object specified in an image processing device, according to an embodiment;

DETAILED DESCRIPTION

Figure 1:
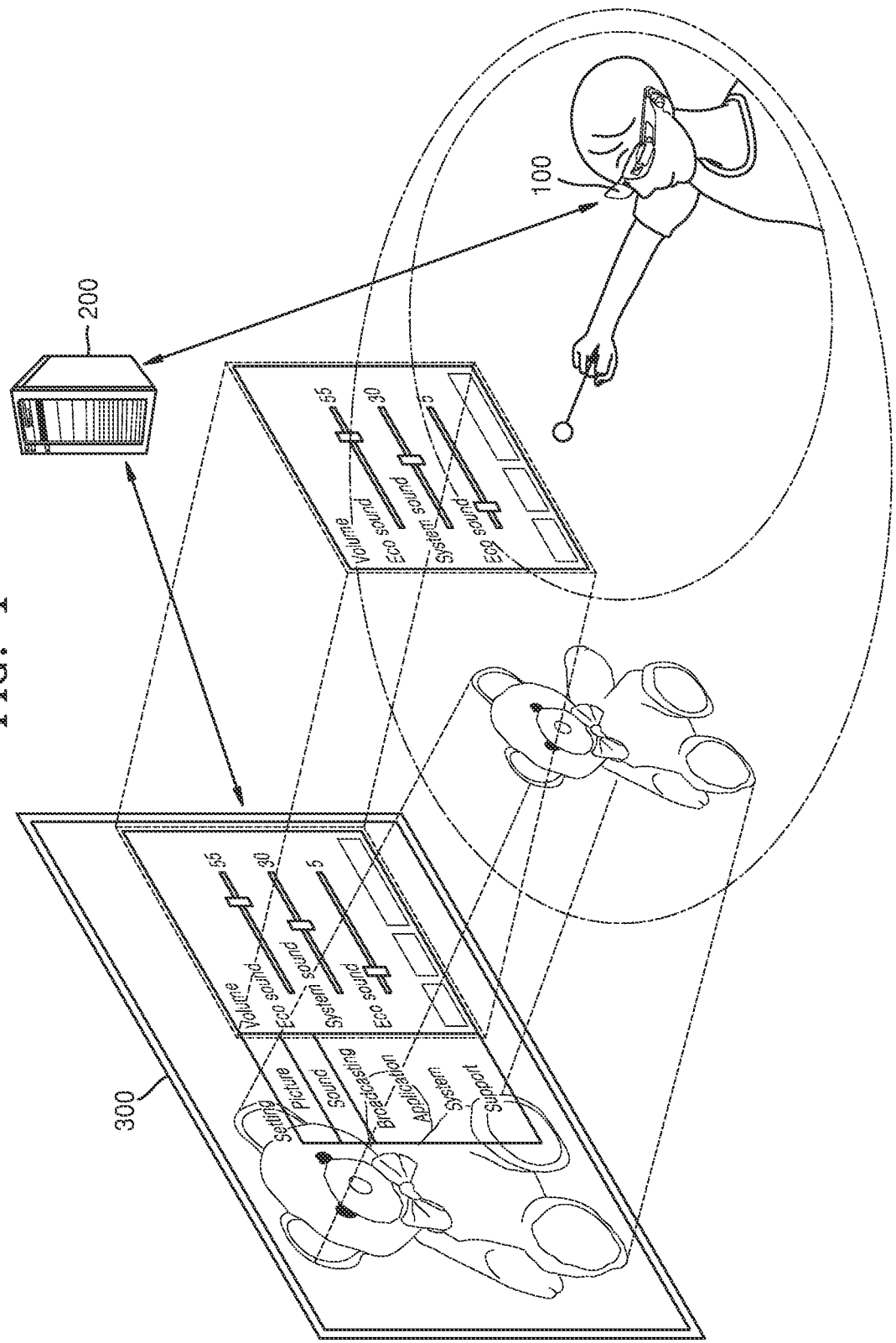
FIG. 1 is a view illustrating an environment where an augmented reality (AR) device interacts with an image processing device, according to an embodiment.

Hereinafter, embodiments of the present disclosure will be described in detail with reference to the drawings, where similar reference characters denote corresponding features consistently throughout, to allow those of ordinary skill in the art to easily carry out the embodiments of the present disclosure. The present disclosure may be implemented in various different forms and are not limited to the examples of the present disclosure described herein.

Throughout the entirety of the specification of the present disclosure, when it is assumed that a certain part includes a certain component, the term "including" or "comprising" means that a corresponding component may further include other components unless specifically described to the contrary. The term used herein such as "unit" or "module" indicates a unit for processing at least one function or operation, and may be implemented in hardware, software, or in a combination of hardware and software.

In addition, terminology, such as "first" or "second" used herein, can be used to describe various components, but the components should not be limited by the terms. These terms are used to distinguish one component from another component.

Various embodiments of the present disclosure relate to a method of controlling an AR device and the AR device performing the method and matters widely known to those of ordinary skill in the art to which the following embodiments belong will not be described in detail.

In the present disclosure, "augmented reality (AR)" may refer to displaying virtual image on a physical environment space of a real world or displaying a real-world object and a virtual image together. In the present disclosure, an "AR display device" refers to a device capable of expressing "AR", and may include AR glasses in the form of glasses, a head-mounted display (HMD) apparatus or an AR helmet, etc.

FIG. 1 is a view illustrating an environment where an AR device 100 interacts with an image processing device 300, according to an embodiment.

As shown in FIG. 1, when the AR device 100 is an AR glasses device, a camera may be installed to be oriented forward in a portion where a glasses frame for supporting a left-eye lens and a right-eye lens and temples for placing the AR device 100 on a face of the user contact each other or may be installed in a center portion of the glasses frame to be oriented forward, without being limited thereto. An eye tracking sensor may be installed on a side surface of the glasses frame oriented to the face to detect the user's eyes, without being limited thereto.

The image processing device 300 may be a collective term for an electronic device capable of generating or processing an image. The image processing device may generate an image including a real-world object and process the image. The image processing device may be a television (TV), a kiosk, a billboard, etc.

The server 200 may be a device that relays between the AR device 100 and the image processing device 300. The server 200 may store information used for smooth interaction between the AR device 100 and the image processing device 300. The server 200 may be implemented in various forms of a server according to a place where the AR device 100 and the image processing device 300 interact with each other.

Referring to FIG. 1, it is shown that the user wearing the AR device 100 experiences AR by causing a real-world object displayed on the image processing device 300, e.g., a setting user interface or media content to be displayed as a virtual image at a position facilitating user's manipulation or appreciation.

As shown in FIG. 1, the AR device 100 may display virtual images of real-world objects to be arranged in different spatial regions suitable for interaction, depending on a type of a real-world object. For example, the virtual image of the setting user interface may be provided in a first spatial region that may be directly manipulated by the user by stretching out a hand of the user, and the media content may be provided in a second spatial region where the user may arrange and view various contents.

Herein below, a description will be made of a method of controlling the AR device 100 and the AR device 100 performing the method to display the virtual image of the real-world object displayed on the image processing device 300 at a position suitable for interaction in AR.

Figure 2:
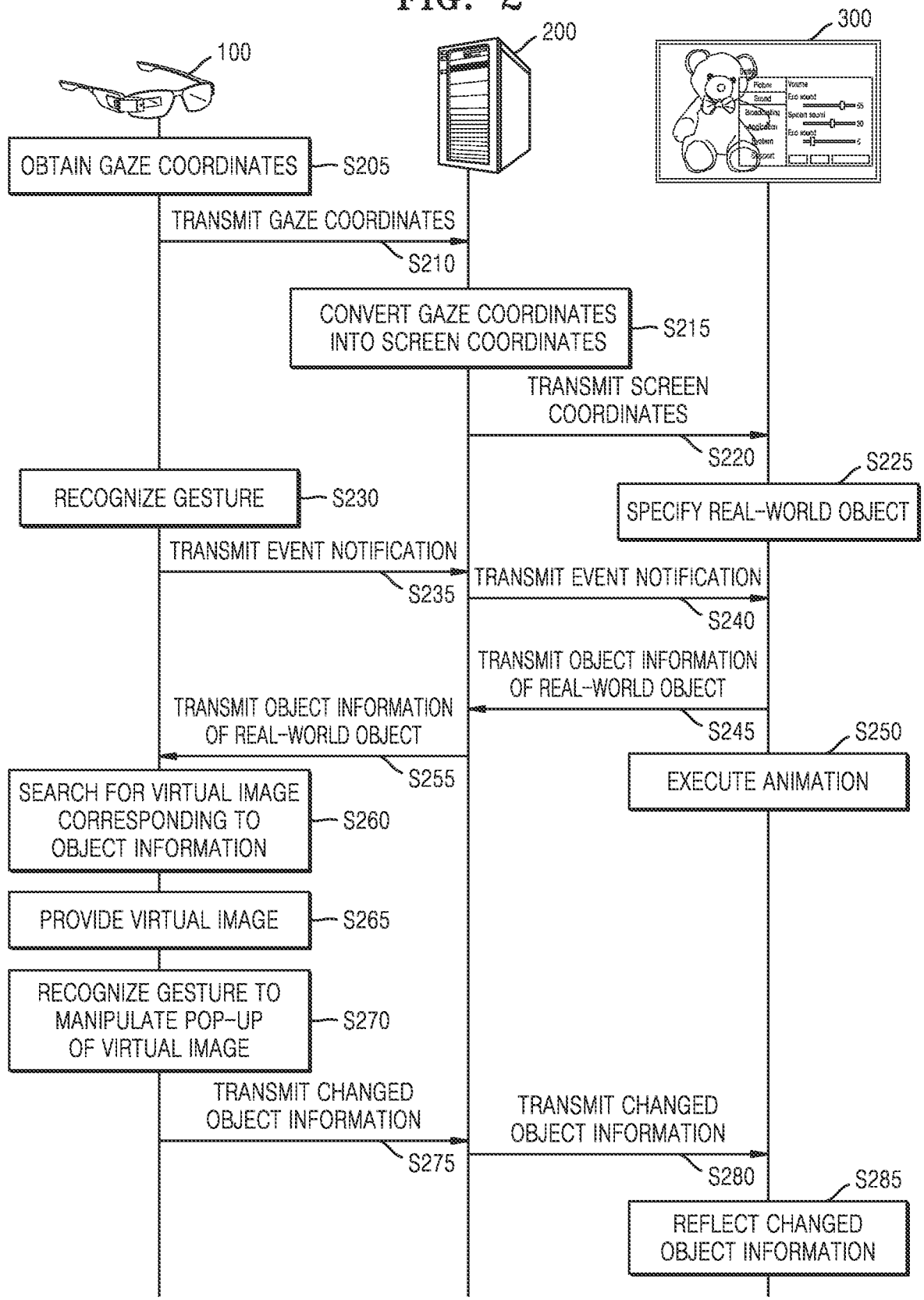
FIG. 2 is a view illustrating a process of providing, by an AR device, a virtual image of a real-world object displayed on an image processing device, through interaction with the image processing device, according to an embodiment.

FIG. 2 is a view illustrating a process of providing, by the AR device 100, a virtual image of a real-world object displayed on the image processing device 300, through interaction with the image processing device 300, according to an embodiment.

With reference to FIG. 2, a description will be made of an example where the AR device 100 performs interaction with the image processing device 300 through the server 200. Unlike illustration in FIG. 2, the AR device 100 may perform communication with the image processing device 300 without relay of the server 200, and in this case, an operation of the server 200 described with reference to FIG. 2 may be omitted or replaced by the AR device 100 or the image processing device 300.

It is assumed in FIG. 2 that when the AR device 100 is communication-connected to the server 200 that relays between the AR device 100 and the image processing device 300, the AR device 100 receives virtual images of real-world objects that may be displayed on the image processing device 300 from the server 200 to prepare for the virtual images on the AR device 100 beforehand. For example, in case of the server 200 being a home network server 200, when the user wearing the AR device 100 enters a region where communication with the home network server 200 is possible or the AR device 100 is powered on in the region, then the AR device 100 may receive the virtual images from the server 200.

The AR device 100 may obtain gaze coordinates corresponding to a real-world object displayed on the image processing device 300 by tracking gaze information of the user wearing the AR device 100 in operation S205. In this case, the gaze coordinates may be three-dimensional (3D) gaze coordinate information and may be coordinate information on a 3D space based on an absolute coordinate system. For example, when the AR device 100 includes a stereo camera and knows a geometric relationship between a first camera coordinate system and a second camera coordinate system, the AR device 100 may calculate 3D gaze coordinates on a 3D space based on gaze coordinates to which a user's gaze is directed in a first image and gaze coordinates corresponding thereto in a second image.

To transmit gaze coordinates corresponding to a real-world object to the image processing device 300 that displays the real-world object, the AR device 100 may transmit the gaze coordinates to the server 200 that performs communication with the image processing device 300 in operation S210. The server 200 may receive the gaze coordinates from the AR device 100.

The server 200 may convert the received gaze coordinates into screen coordinates of the image processing device 300 that displays the real-world object, in operation S215.

The server 200 may transmit the converted screen coordinates to the image processing device 300 in operation S220. The image processing device 300 may receive the screen coordinates corresponding to the gaze coordinates from the server 200.

The image processing device 300 may specify the real-world object displayed on the image processing device 300 according to the screen coordinates corresponding to the gaze coordinates, in operation S225.

Figure 3:
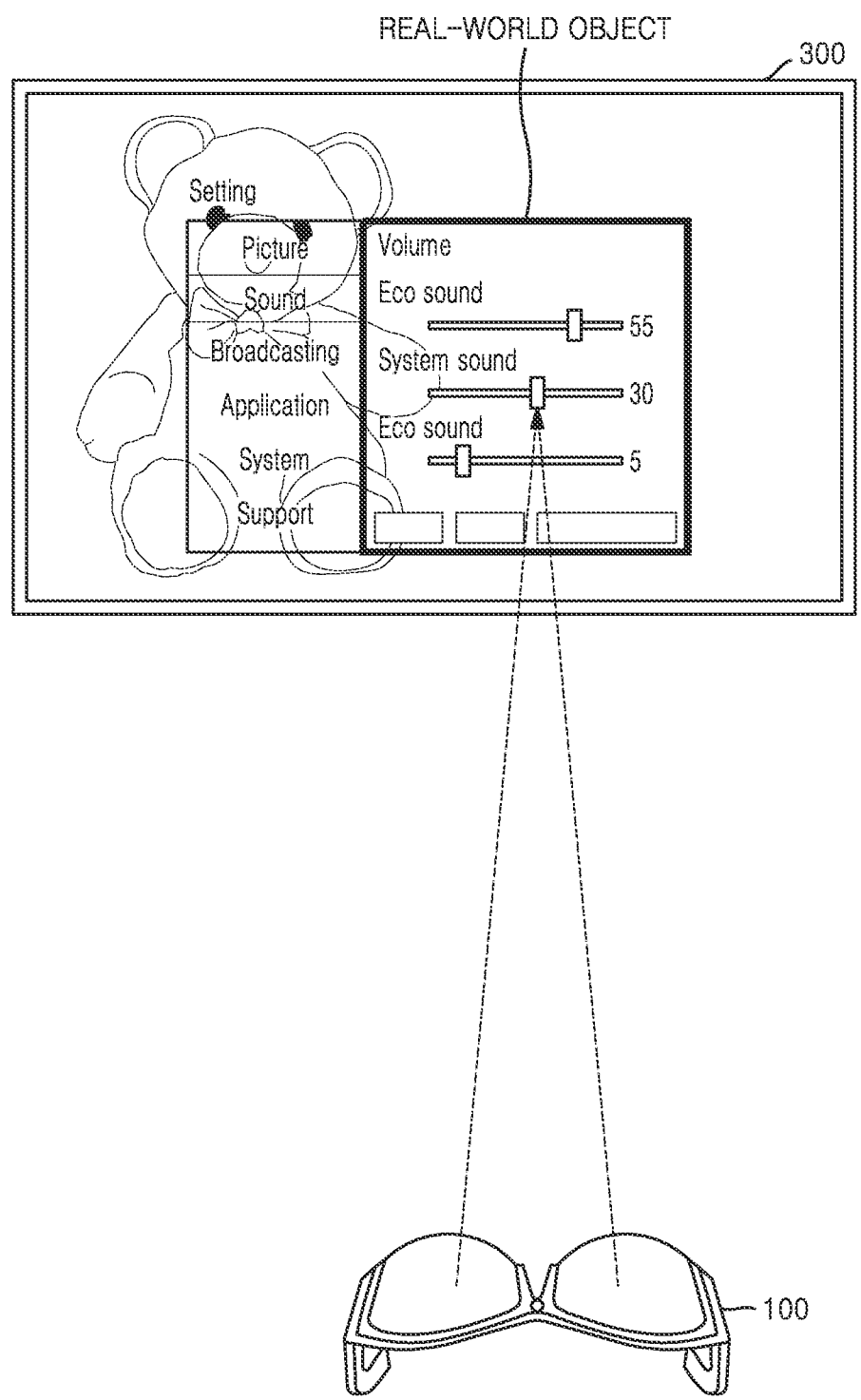
FIG. 3 is a view illustrating a state where an image processing device specifies a real-world object, according to an embodiment.

FIG. 3 is a view illustrating a state where the image processing device 300 specifies a real-world object.

The image processing device 300 may specify the real-world object currently displayed on the image processing device 300 according to the screen coordinates corresponding to the gaze coordinates obtained by the AR device 100. As shown in FIG. 3, the image processing device 300 may specify the setting user interface displayed at a position of the screen coordinates corresponding to the gaze coordinates of the user. To inform the user that the real-world object to which the user's gaze is directed, the image processing device 300 may cause the setting user interface to enter a hovering state by changing a color of an edge region of the setting user interface or displaying a separate icon, but the present disclosure is not limited thereto. The image processing device 300 may indicate that the real-world object is hovered, by applying a display effect to a specified real-world object to give a cubic effect or changing a color of a background color of the specific real-world object.

Referring back to FIG. 2, the AR device 100 may recognize a gesture to call a virtual image of a real-world object specified in the image processing device 300 in operation S230. The AR device 100 may recognize the gesture to call the virtual image of the specified real-world object when a certain hand pose is detected in a state where the real-world object specified in the image processing device 300 is hovered. The hand pose may mean an appearance or motion of the hand, and collectively refer to various forms of hand expression that may be a signal. The appearance of the hand may mean an outward appearance of the hand. The motion of the hand may mean movement or moving appearance of the hand.

FIG. 4 is a view illustrating a state where the AR device 100 recognizes a gesture that calls a virtual image of a real-world object specified in the image processing device 300.

The AR device 100 may detect a certain hand pose through the camera of the AR device 100 in the state where the real-world object specified by the image processing device 300 is hovered. To this end, the AR device 100 may previously register information about the hand of the user and information about the gesture to call the virtual image of the real-world object specified in the image processing device 300.

The AR device 100 may detect the hand pose of the user based on the obtained information about the hand of the user and an image obtained through the camera. The camera may include a camera module suitable for the form or specifications of the AR device 100 and may be, but not limited to a mono camera or a stereo camera. The camera may extract depth information in a time-of-flight (ToF) manner or a stereo vision manner, when detecting the hand pose of the user, depending on a type thereof, but the present disclosure is not limited thereto.

As shown in FIG. 4, in the state where the setting user interface that is the real-world object specified in the image processing device 300 is hovered, the AR device 100 may recognize the gesture to call the virtual image of the setting user interface based on the image obtained through the camera. For example, when the user makes a "grab and pull" gesture of grabbing the hand and pulling the hand toward the user in the hovered state of the setting user interface, then the AR device 100 may detect occurrence of an event for calling the virtual image of the setting user interface.

Referring back to FIG. 2, to transmit the event notification corresponding to the recognized gesture to the image processing device 300, the AR device 100 may transmit an event notification to the server 200 that performs communication with the image processing device 300 in operation S235. The event notification may be a signal indicating that the user is to experience the real-world object currently specified in the image processing device 300 as a virtual image through the AR device 100 and may include message information in a form pre-agreed between the AR device 100 and the image processing device 300. The server 200 may receive the event notification from the AR device 100.

The server 200 may transmit the received event notification to the image processing device 300 in operation S240. The image processing device 300 may receive the event notification from the server 200.

The image processing device 300 may transmit object information of the specified real-world object to the server 200 in response to the event notification received from the server 200 in operation S245. For example, the object information may include identification information and data information of the specified real-world object.

The image processing device 300 may execute animation providing an effect as if a specified real-world object comes out of the display of the image processing device 300 in operation S250. The animation performed in this way may overlap the pop-up of the virtual image of the specified real-world object appearing on the AR device 100 such that the user may experience a visual effect as if the real-world object naturally changes to the virtual image.

The server 200 may object information of the specified real-world object to the AR device 100 in operation S255. The AR device 100 may receive the object information of the specified real-world object, transmitted by the image processing device 300, by receiving the object information of the specified real-world object from the server 200.

The AR device 100 may search for a virtual image corresponding to the object among prepared virtual images in operation S260. The AR device 100 may search for a virtual image corresponding to the identification information among the prepared virtual images.

The AR device 100 may provide the found virtual image to a depth layer corresponding to a type of the specified real-world object in operation S265. The AR device 100 may reflect data information transmitted from the image processing device 300 in the virtual image corresponding to the identification information and provide the virtual image to the depth layer corresponding to the type of the specified real-world object.

The AR device 100 may provide virtual images of specified real-world objects to different depth layers when types of the specified real-world objects are different from each other. The AR device 100 may provide a first virtual image of a first-type real-world object to a first depth layer and a second virtual image of a second-type real-world object to a second depth layer. The first depth layer may display a virtual image such that a pop-up of the virtual image may be observed at a closer position than the second depth layer. For example, the AR device 100 may provide the virtual image of the setting user interface to the first depth layer when the specified real-world object is the setting user interface, and the AR device 100 may provide the virtual image of the media content to the second depth layer when the specified real-world object is media content.

The AR device 100 may recognize a gesture to manipulate the pop-up of the virtual image in operation S270. In case of the pop-up of the virtual image being displayed on the AR device 100, when the user wearing the AR device 100 exposes the hand to the camera of the AR device 100 to manipulate the pop-up of the virtual image, then the AR device 100 may process the virtual image such that the pop-up of the virtual image may be manipulated by the exposed hand.

Figure 5:
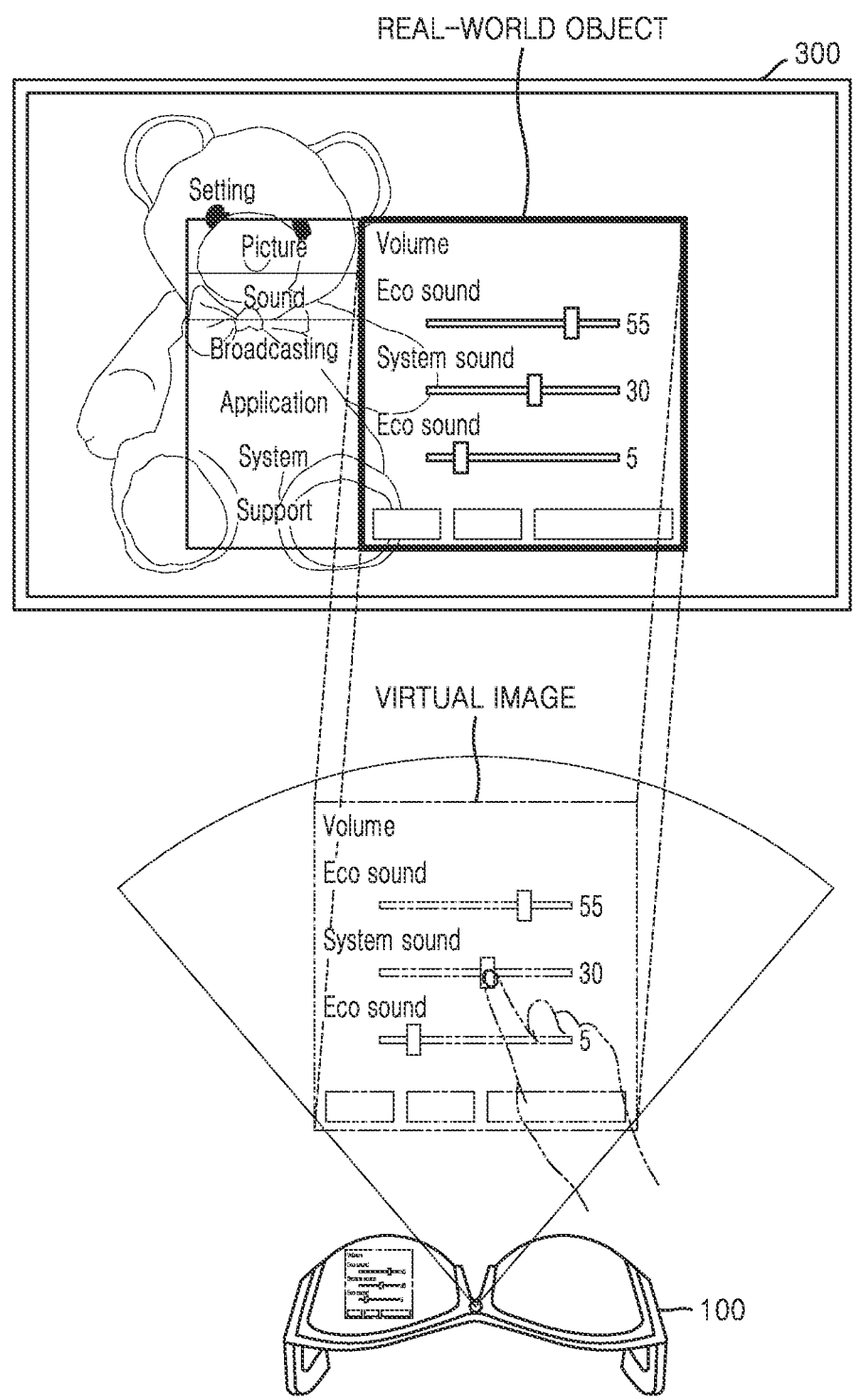
FIG. 5 is a view illustrating a state where an AR device displays a pop-up of a virtual image by providing a virtual image of a real-world object specified in an image processing device to a display of the AR device, according to an embodiment.

FIG. 5 is a view illustrating a state where the AR device 100 displays a pop-up of a virtual image by providing a virtual image of a real-world object specified in the image processing device 300 to a display of the AR device 100.

The AR device 100 may search for a virtual image corresponding to the identification information of the setting user interface among the prepared virtual images after receiving the object information of the setting user interface transmitted by the image processing device 300, generate a virtual image reflecting data information transmitted from the image processing device 300, and provide the virtual image to the depth layer corresponding to the type of the setting user interface.

As shown in FIG. 5, the AR device 100 may provide the virtual image of the setting user interface to the first depth layer when the specified real-world object is the setting user interface. Unlike illustration in FIG. 5, when the specified real-world object is the media content, the AR device 100 may provide the virtual image of the media content to the second depth layer.

When the AR device 100 displays the pop-up of the virtual image, the user wearing the AR device 100 may position the user's hand to be detected by the camera to manipulate the pop-up of the virtual image and may take a hand pose to adjust a setting value of a menu in the setting user interface on the pop-up of the virtual image. Thus, the AR device 100 may recognize the gesture to manipulate the pop-up of the virtual image. The AR device 100 may display the pop-up of the virtual image of the setting user interface for which the setting value is adjusted, based on the recognized gesture.

Referring back to FIG. 2, to transmit the object information changed according to manipulation of the pop-up of the virtual image to the image processing device 300, the AR device 100 may transmit the changed object information to the server 200 in operation S275. The changed object information may include the identification information of the specified real-world object and the changed data information. The server 200 may receive the changed data information from the AR device 100.

The server 200 may transmit the changed object information to the image processing device 300 in operation S280. The image processing device 300 may receive the changed object information from the server 200.

The image processing device 300 may reflect the changed object information received from the server 200 in an operation of the image processing device 300 in operation S285.

Figure 6:
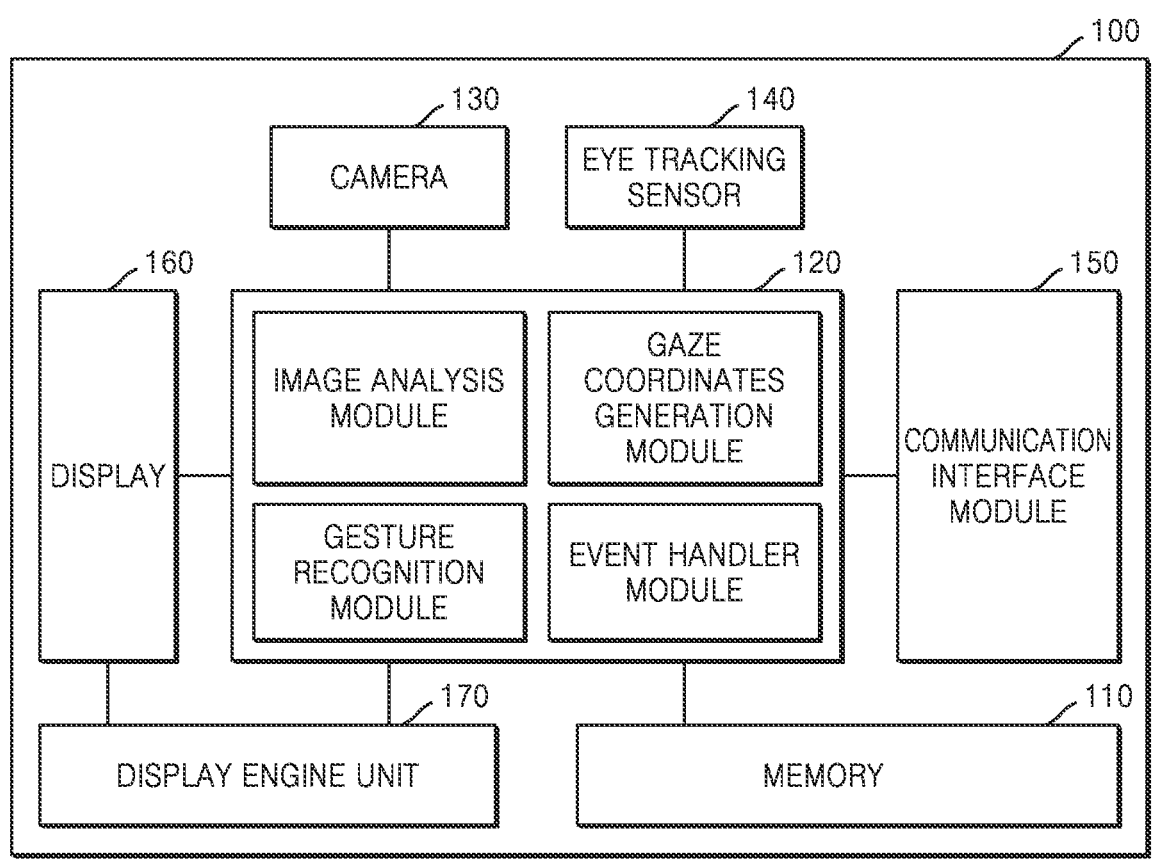
FIG. 6 is a view illustrating a configuration and an operation of an AR device, according to an embodiment.

FIG. 6 is a view illustrating a configuration and an operation of the AR device 100, according to an embodiment.

Referring to FIG. 6, the AR device 100 may include a memory 110, a processor 120, a camera 130, an eye tracking sensor 140, a communication interface (e.g., communication interface module 150), a display 160, and a display engine (e.g., display engine unit 170). The AR device 100 may further include components such as a position sensor that detects a position of the AR device 100 or a power source unit that supplies power to the AR device 100, and it would be understood by those of ordinary skill in the art that other general-purpose components than the components shown in FIG. 2 may be further included.

The memory 110 may store instructions executable by the processor 120. The memory 110 may store a program including instructions. The memory 110 may include a hardware device of at least one type of random access memory (RAM), static random access memory (SRAM), read-only memory (ROM), flash memory, electrically erasable programmable read-only memory (EEPROM), programmable read-only memory (PROM), magnetic memory, a magnetic disk, and an optical disk.

The memory 110 may store at least one software module including instructions. Each software module may be executed by the processor 120 to cause the AR device 100 to perform a specific operation or function. For example, as shown in FIG. 6, an image analysis module, a gaze coordinate generation module, a gesture recognition module, an event handler module, etc., may be executed by the processor 120, but the present disclosure is not limited thereto and other software modules may be further included.

The processor 120 may control an operation or function performed by the AR device 100 by executing the instructions stored in the memory 110 or a programmed software module. The processor 120 may include hardware components for performing arithmetic, logic, and input/output operations and signal processing.

The processor 120 may include, for example, at least one hardware, but not limited to, among a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs),).

The camera 130, which is a device capturing a scene of the real world, may be a stereo camera or a single camera that obtains a stereo image. The camera may include a lens module including lenses, an auto focus (AF) actuator, an image sensor, and an image signal processor. The lens module may have a structure where a plurality of lenses are arranged in a body tube portion, and allow light incident externally to pass through the arranged lenses. The AF actuator may move lenses to an optimal focus position to obtain an image of a clear quality. The image signal processor may convert an electric signal converted by the image sensor into an image signal.

The eye tracking sensor 140 may detect gaze information such as a gaze direction in which a user's eye is directed, a position of a pupil of the eye of the user, coordinates of the center point of the pupil, etc. For example, the eye tracking sensor 140 may irradiate infrared light to the user's eye and receive the reflected light to detect the pupil from a captured image and track movement of the pupil. The processor 120 may determine an eye movement form based on user's gaze information detected by the eye tracking sensor 140. For example, the processor 120 may determine various forms of gaze movement including fixation keeping an eye on any point, pursuit chasing a moving object, saccade of a rapid movement of an eye from a gaze point to another gaze point, etc., based on the gaze information obtained from the eye tracking sensor 140.

The processor 120 of the AR device 100 may determine user's gaze point or gaze movement by using the eye tracking sensor 140 to use the determined gaze point or gaze movement for control of the AR device 100. The processor 120 may control a direction of the camera 130 according to the gaze point or gaze movement determined by the eye tracking sensor 140 to obtain at least one image.

The communication interface module 150 may be connected to a device positioned outside the AR device 100 to transmit information obtained or generated by the AR device 100 to an external device or receive various types of information from the external device. The communication interface module 150 may perform communication with another device or a network. To this end, the communication interface module 150 may include a communication module supporting at least one of various communication methods. For example, a communication module performing short-range communication such as wireless fidelity (WiFi), Bluetooth, etc., or various types of mobile communication or ultra-wideband communication may be included.

The AR device 100 may provide a pop-up of a virtual image through the display 160 and the display engine unit 170. The virtual image may be generated through an optical engine and may include both a static image and a dynamic image. The virtual image may be observed together with a scene of the real world viewed by the user through the AR device, i.e., a real scene, and may be an image corresponding to the real-world object in the real scene or an image representing information about an operation of the AR device 100, a control menu, etc.

The display engine unit 170 may include an optical engine that generates and projects a virtual image and a guide unit that light of the virtual image projected from the optical engine to the display 160. The display 160 may include a light guide plate (a waveguide) in a see-through form embedded in a left-eye lens and/or a right-eye lens. The display 160 may display the virtual image of the real-world object or the virtual image representing the information about the operation of the AR device 100 or the control menu.

The display 160 may be implemented in a form including a plurality of depth layers, and may display the virtual image of the real-world object at a position suitable for interaction in AR by providing the virtual image of the real-world object in a depth layer corresponding to a type of the real-world object. The display 160 may include a plurality of depth layers where the pop-up of the virtual image is observed at different positions. For example, the first depth layer may display a pop-up of the virtual image so as to be observed at a closer position than the second depth layer. The second depth layer may display a virtual image such that a pop-up of the virtual image may be arranged and observed in the wider space than the first depth layer.

When the pop-up of the virtual image is observed through the display 160, the user wearing the AR device 100 may expose the user's hand to the camera 130 to manipulate the pop-up of the virtual image and may manipulate the pop-up of the virtual image by the exposed hand.

According to the above-described configuration, the processor 120 of the AR device 100 may, by executing at least one of the image analysis module, the gaze coordinate generation module, the gesture recognition module, and the event handler module stored in the memory 110, provide the virtual image of the real-world object displayed on the image processing device 300 to a depth layer corresponding to the type of the real-world object to display the virtual image of the real-world object at a position suitable for interaction in AR.

The processor 1200 may, by executing instructions stored in the memory 110, obtain gaze coordinates corresponding to the real-world object based on the gaze information obtained through the eye tracking sensor 140. For example, the processor 120 may obtain a coordinate pair of gaze coordinates from a stereo image and obtain 3D gaze coordinates from the coordinate pair, based on the gaze information obtained using the eye tracking sensor 140. The processor 120 may transmit the gaze coordinates corresponding to the real-world object to the image processing device 300 that displays the real-world object, through the communication interface module 150. As a result, the image processing apparatus 300 may specify the real-world object based on screen coordinates corresponding to the gaze coordinates.

The processor 120 may recognize a gesture to call the virtual image of the real-world object specified by the image processing device 300 according to the screen coordinates corresponding to the gaze coordinates, based on the image captured through the camera 130. When the processor 120 detects a certain hand pose in the hovered state of the real-world object specified in the image processing device 300 based on the image captured through the camera 130, the processor 120 may recognize the gesture to call the virtual image.

The processor 120 may receive the object information of the specified real-world object from the image processing device 300 in response to transmitting the event notification corresponding to the recognized gesture to the image processing device 300 through the communication interface module 150. For example, the object information may include the identification information of the real-world object specified in the image processing device 300 and the data information. The processor 120 may control the display engine unit 170 to provide a virtual image corresponding to the object information among prepared virtual images to a depth layer of the display 160 corresponding to a type of the specified real-world object. For example, the processor 120 may control the display engine unit 170 to reflect the data information in a virtual image corresponding to the identification information among the prepared virtual images and provide the virtual image to a depth layer of the display 160. The prepared virtual images may be received from the server 200 through the communication interface module 150 when the AR device 100 is communication-connected with the server 200 that relays between the AR device 100 and the image processing device 300.

The processor 120 may provide virtual images of specified real-world objects to different depth layers of the display 160 when types of the specified real-world objects are different from each other. The processor 120 may provide the first virtual image of the first-type real-world object to the first depth layer of the display 160 and provide the second virtual image of the second-type real-world object to the second depth layer of the display 160. The first depth layer of the display 160 may display a pop-up of a virtual image so as to be observed at a closer position than the second depth layer of the display 160. For example, the processor 120 may provide the virtual image of the setting user interface to the first depth layer of the display 160 when the specified real-world object is the setting user interface, and the processor 120 may provide the virtual image of the media content to the second depth layer of the display 160 when the specified real-world object is media content.

The processor 120 may recognize a gesture to manipulate the pop-up of the virtual image based on the image captured through the camera 130 and transmit the object information changed by manipulation to the image processing device 300 through the communication interface module 150.

Figure 7:
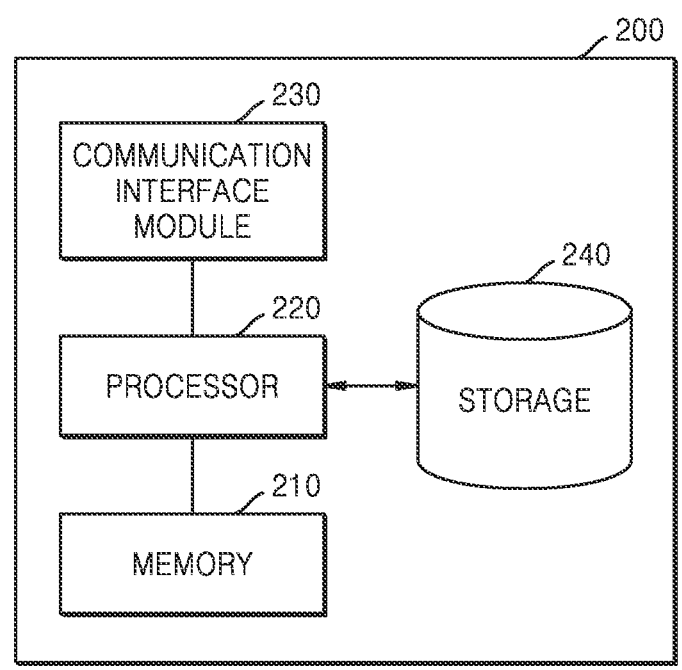
FIG. 7 is a view illustrating a configuration and an operation of a server, according to an embodiment.

FIG. 7 is a view illustrating a configuration and an operation of the server 200, according to an embodiment.

Referring to FIG. 7, the server 200 may include a memory 210, a processor 220, a communication interface module 230, and a storage 240. It would be understood by those of ordinary skill in the art that other general-purpose components than the components shown in FIG. 7 may be further included.

Each component of the block diagram of FIG. 7 may be divided, added, or omitted depending on an implementation scheme of the server 200. That is, depending on the implementation scheme, one component may be divided into two or more components, or two or more components may be integrated into one component, and some components may be further added or removed.

The memory 210 may store instructions executable by the processor 220. The memory 210 may store software or a program.

The processor 220 may execute the instruction stored in the memory 210. The processor 220 may perform overall control of the server 200. The processor 220 may obtain information and request details received through the communication interface module 230, and store received information in the storage 240. The processor 220 may process the received information. For example, the processor 220 may obtain information used in a second external device from information received from a first external device or process received information. The processor 220 may deliver the information received from the first external device to the second external device.

The communication interface module 230 may perform communication with an external device such as the AR device 100, the image processing device 300, etc. For example, the server 200 may receive the gaze coordinates or the event notification from the AR device 100 or deliver the screen coordinates or the event notification to the image processing device 300.

The storage 240 may store various software or information. For example, the storage 240 may store a program or an application executed in the server 200 and various data or information used in relay between the AR device 100 and the image processing device 300. The storage 240 may correspond information of the AR device 100 and the image processing device 300 connected to the same network to each other and store the information. For example, the server 200 may register in advance information about the AR device 100 and information about the image processing device 300 for each user in the storage 240. Thus, when the server 200 receives information from the AR device 100, the server 200 may determine to which image processing device 300 the information is to be delivered.

Figure 8:
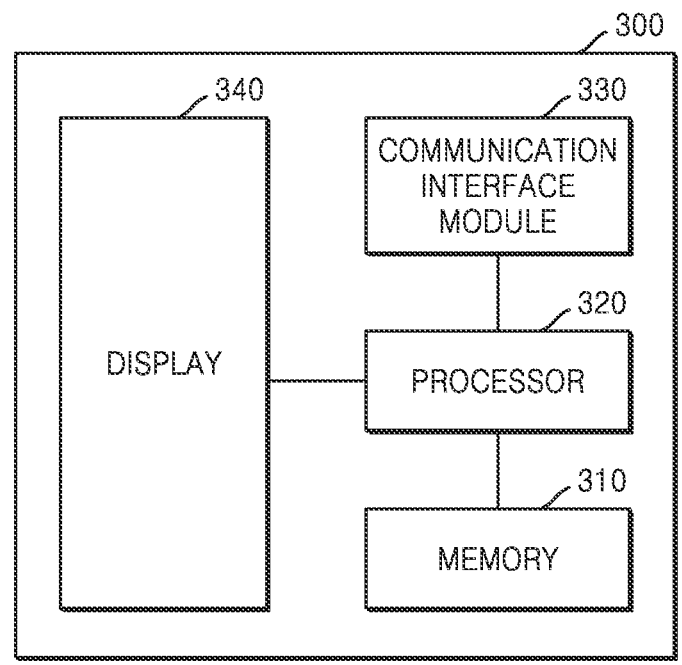
FIG. 8 is a view illustrating a configuration and an operation of an image processing device, according to an embodiment.

FIG. 8 is a view illustrating a configuration and an operation of the image processing device 300, according to an embodiment.

Referring to FIG. 8, the image processing device 300 may include a memory 310, a processor 320, a communication interface module 330, and a display 340. It would be understood by those of ordinary skill in the art that other general-purpose components than the components shown in FIG. 8 may be further included.

The memory 310 may store software and/or a computer program. For example, the memory 310 may store an application, a program such as an application programming interface (API), etc., and various types of data. The memory 310 may store instructions executable by the processor 320.

The processor 320 may access data stored in the memory 310 to use the data or store new data in the memory 310. The processor 320 may execute instructions stored in the memory 310. The processor 320 may execute an application installed in the image processing device 300.

The processor 320 may include at least one processing modules. The processor 320 may control other components included in the image processing device 300 to perform an operation corresponding to an execution result of an instruction, a computer program, etc.

The communication interface module 330 may perform wired/wireless communication with another device or a network. To this end, the communication interface unit 330 may include a communication module supporting at least one of various wired/wireless communication methods. For example, a communication module performing short-range communication such as wireless fidelity (WiFi), Bluetooth, etc., or ultra-wideband communication may be included. The communication interface module 330 may be connected to a device located outside the image processing device 300 to transmit and receive a message including a signal or data.

The display 340 may include a display panel and a controller for controlling the display panel, and may be implemented in various manners, such as a liquid crystal display (LCD), an organic light emitting diode (OLED) display, an active-matrix organic light-emitting diode (AM-OLED), a plasma display panel (PDP), etc. The display 340 may be provided in the form of a touch screen where a display panel and a touch panel are combined and may be implemented flexibly or rollably.

The processor 320 may perform the following operations by executing the instructions stored in the memory 310. The processor 320 of the image processing device 300 may transmit and receive information to and from an external device through the communication interface module 330. The processor 320 of the image processing device 300 may display a setting user interface or a real-world object such as media content on the display 340, based on the information received from the processor 320 of the image processing device 300. For example, the processor 320 of the image processing device 300 may specify the displayed real-world object according to the screen coordinates received from the server 200. The processor 320 of the image processing device 300 may display the specified real-world object as being in the hovered state. The processor 320 of the image processing device 300 may transmit the object information of the specified real-world object to the server 200 in response to the event notification received from the server 200, and may perform animation to provide an effect as if the specified real-world object comes out of the display of the image processing device 300. The processor 320 of the image processing device 300 may receive the changed object information of the specified real-world object from the server 200, and reflect the changed object information in the operation of the image processing device 300.

Figure 9:
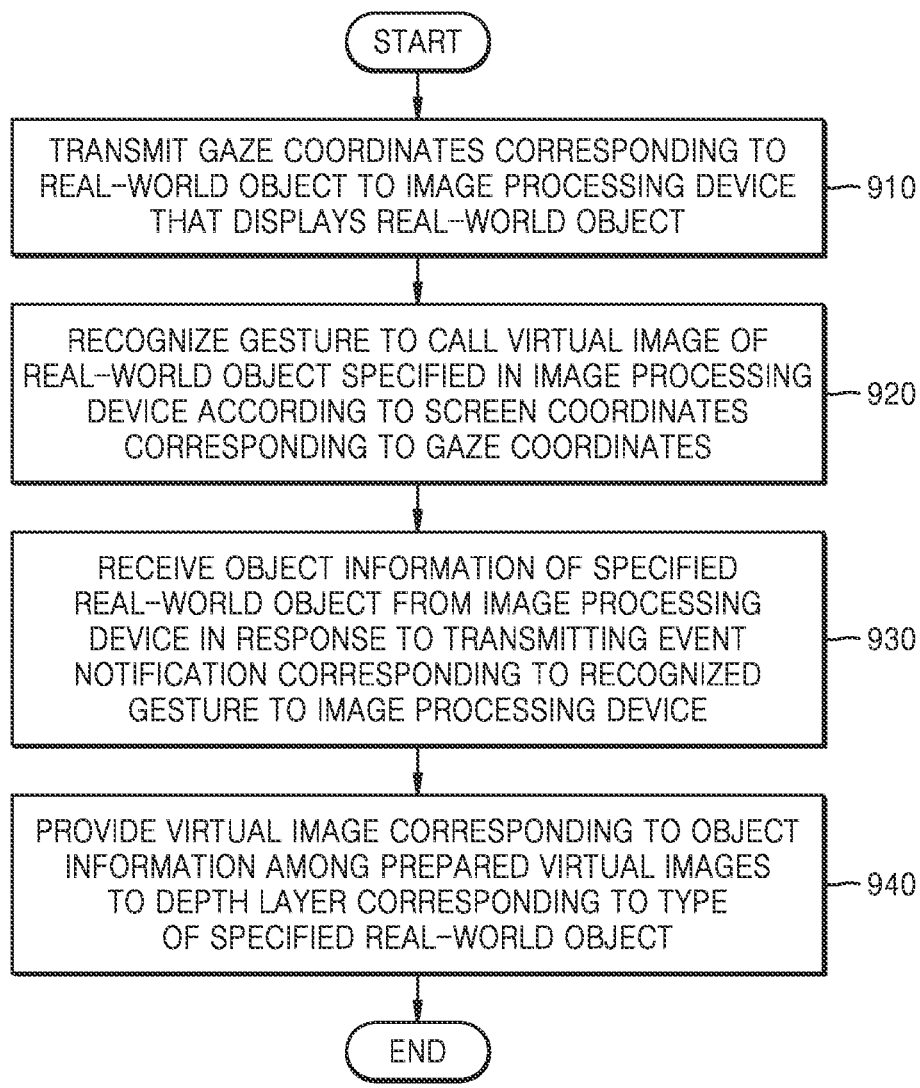
FIG. 9 is a flowchart of a method of controlling an AR device, according to an embodiment.

FIG. 9 is a flowchart of a method of controlling the AR device 100, according to an embodiment. Terms and matters overlapping with the foregoing description will not be described in detail below.

In operation 910, the AR device 100 may transmit gaze coordinates corresponding to a real-world object to the image processing device 300 that displays the real-world object. To this end, the server 200 connected to the AR device 100 through a network may convert gaze coordinates transmitted from the AR device 100 into screen coordinates available in the image processing device 300 and transmit the screen coordinates corresponding to the gaze coordinates to the image processing device 300. The image processing device 300 may specify the real-world object based on the screen coordinates corresponding to the gaze coordinates.

In operation 920, the AR device 100 may recognize a gesture to call a virtual image of the real-world object specified by the image processing device 300 according to the screen coordinates corresponding to the gaze coordinates. When the AR device 100 detects a certain hand pose in the hovered state of the real-world object specified in the image processing device 300 based on the image captured through the camera 130, the AR device 100 may recognize the gesture to call the virtual image of the specified real-world object.

In operation 930, the AR device 100 may receive object information of the specified real-world object from the image processing device 300 in response to transmitting an event notification corresponding to the recognized gesture to the image processing device 300. For example, the object information may include identification information of the real-world object specified in the image processing device 300 and data information.

In operation 940, the AR device 100 may control the display engine unit 170 to provide a virtual image corresponding to the object information among prepared virtual images to a depth layer corresponding to a type of the specified real-world object. For example, the AR device 100 may reflect the data information in a virtual image corresponding to the identification information among prepared virtual images and provide the virtual image to a depth layer of the display 160. The prepared virtual images may be received from the server 200 through the communication interface module 150 when the AR device 100 is communication-connected with the server 200 that relays between the AR device 100 and the image processing device 300.

Virtual images of specified real-world objects may be provided to different depth layers of the display 160 when types of the specified real-world objects are different from each other. The AR device 100 may provide a first virtual image of a first-type real-world object to a first depth layer and a second virtual image of a second-type real-world object to a second depth layer. The first depth layer may display a virtual image such that a pop-up of the virtual image may be observed at a closer position than the second depth layer. For example, the virtual image of the setting user interface may be provided to the first depth layer when the specified real-world object is the setting user interface, and the virtual image of the media content may be provided to the second depth layer when the specified real-world object is media content.

The AR device 100 may recognize a gesture to manipulate a pop-up of a virtual image and transmit object information changed by manipulation to the image processing device 300.

The AR device 100 described in the present disclosure may be implemented by a hardware element, a software element, and/or a combination of the hardware element and the software element. For example, the AR device 100 described in the disclosed embodiments may be implemented using one or more general-purpose computers or special-purpose computers, like a processor, an arithmetic logic unit (ALU), an application specific integrated circuit (ASIC), a digital signal processor (DSP), a digital signal processing device (DSPD), a programmable logic device (PLD), a microcomputer, a microprocessor, or any other device capable of running and responding to an instruction.

Software may include a computer program, a code, an instruction, or a combination of one or more thereof, and may configure a processing device to operate as desired or independently or collectively instruct the processing device.

Disclosed embodiments of the disclosure may be implemented as a software (S/W) program including an instruction stored in a computer-readable storage media. The computer-readable recording media may include, for example, a magnetic storage medium (e.g., read-only memory (ROM), random access memory (RAM), a floppy disk, a hard disk, etc.) and an optical reading medium (e.g., compact disk (CD)-rom, a digital versatile disc (DVD), etc.). The computer-readable recording medium may be distributed over computer systems connected through a network to store and execute a computer-readable code in a distributed manner. The medium may be readable by a computer, and may be stored in a memory and executed in a processor.

The computer may invoke stored instructions from the storage medium and operate based on the invoked instructions according to the disclosed embodiment of the disclosure, and may include the AR device 100 according to the disclosed embodiments of the present disclosure.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

The method according to the disclosed embodiments of the present disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a software program electronically distributed through a manufacturer of the electronic device or the electronic market (e.g., Samsung Galaxy Store™, Google Playstore™, and App Store™). For the electronic distribution, at least a part of the software program may be stored in a storage medium or temporarily generated. In this case, the storage medium may be a storage medium of a server in the manufacturer, the electronic market, or a relay server that temporarily stores the software program.

The computer program product may include a storage medium of the server or a storage medium of the terminal in a system including the server and the terminal (e.g., the AR device or the image processing device). Alternatively, when there is a third device (e.g., a smart phone) communication-connected to the server or the terminal, the computer program product may include a storage medium of the third device. Alternatively, the computer program product may include a software program itself, which is transmitted from the server to the terminal or the third device or transmitted from the third device to the terminal.

In this case, one of the server, the terminal, and the third device may execute the computer program product to perform the method according to the embodiments of the present disclosure. Alternatively, two or more of the server, the terminal, and the third device may execute the computer program product to execute the method according to the embodiments of the present disclosure in a distributed manner.

For example, a server (e.g., a cloud server or artificial intelligence (AI) server, etc.) may execute a computer program product stored in the server to control the terminal communication-connected to the server to perform the method according to the embodiments of the disclosure.

In another example, the third device may execute the computer program product to control the terminal communication-connected to the third device to perform the method according the disclosed embodiment of the present disclosure.

When the third device executes the computer program product, the third device may download the computer program product and execute the downloaded computer program product. Alternatively, the third device may execute a computer program product provided in a preloaded state to execute the method according to the disclosed embodiments of the present disclosure.

While examples of the present disclosure have been described by the limited examples of the present disclosure and drawings, various modifications and changes may be made from the present disclosure by those of ordinary skill in the art. While preferred example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. For example, even when described techniques are performed in a sequence different from the described components such as the electronic device, the structure, the circuit, etc. are combined or connected differently from the described method, or replaced with other components or equivalents, an appropriate result may be achieved. Also, it is intended that such modifications are not to be interpreted independently from the technical idea or prospect of the disclosure.

What is claimed is:

1. An augmented reality (AR) device comprising:
an eye tracking sensor configured to obtain gaze information of a user;
a communication interface;
a camera;
a display engine;
a display;
a memory storing one or more instructions; and
a processor configured to execute the one or more instructions to:
transmit, through the communication interface, gaze coordinates corresponding to an object based on the gaze information to an image processing device that is external to the AR device and displays the object on a screen of the image processing device, wherein the gaze coordinates are correlated with screen coordinates of the object displayed on the screen, wherein a visual effect is applied to the screen coordinates of the object displayed on the screen,
recognize, based on an image captured through the camera in a state in which the visual effect is applied to the screen coordinates of the object displayed on the screen, a first gesture to call a virtual image of the object displayed on the screen of the image processing device,
receive, through the communication interface, object information of the object from the image processing device in response to an event notification transmitted to the image processing device, the event notification corresponding to the recognized first gesture, and
based on the object being a setting user interface,
control the display engine to provide on the display of the AR device, while the object is displayed on the screen of the image processing device, a virtual image of the setting user interface corresponding to the object information among prepared virtual images, the virtual image of the setting user interface provided at a first depth layer of the display,
recognize a second gesture that manipulates a pop-up of the virtual image of the setting user interface to change one or more settings of the setting user interface, and
transmit, to the image processing device, information that causes the image processing device to change the one or more settings in accordance with the second gesture.

2. The AR device of claim 1, wherein the processor is further configured to execute the one or more instructions to:
based on types of objects being different from each other, provide virtual images of the objects to different depth layers of the display.

3. The AR device of claim 1, wherein the processor is further configured to execute the one or more instructions to provide a first virtual image of a first-type of object to the first depth layer of the display and provide a second virtual image of a second-type of object to a second depth layer of the display.

4. The AR device of claim 3, wherein the first depth layer of the display displays a pop-up of the first virtual image so as to be observed at a closer position than the second depth layer of the display.

5. The AR device of claim 1, wherein the processor is further configured to execute the one or more instructions to:
based on the object being media content, provide a virtual image of the media content on the display of the AR device at a second depth layer of the display.

6. The AR device of claim 1, wherein the object information comprises identification information of the object and data information, and
the processor is further configured to execute the one or more instructions to control the display engine to reflect the data information in a virtual image corresponding to the identification information among the prepared virtual images and provide the virtual image corresponding to the identification information at a depth layer of the display.

7. The AR device of claim 1, wherein the prepared virtual images are received from a server through the communication interface when the AR device is communicably connected to the server that relays between the AR device and the image processing device.

8. The AR device of claim 1, wherein the display comprises a plurality of depth layers where a pop-up of the virtual image of the object is observed at different positions.

9. A method of controlling an augmented reality (AR) device, the method comprising:
transmitting gaze coordinates corresponding to an object based on gaze information to an image processing device that is external to the AR device and displays the object on a screen of the image processing device, wherein the gaze coordinates are correlated with screen coordinates of the object displayed on the screen, wherein a visual effect is applied to the screen coordinates of the object displayed on the screen;
recognizing, in a state in which the visual effect is applied to the screen coordinates of the object displayed on the screen, a first gesture to call a virtual image of the object displayed on the screen of the image processing device;
receiving object information of the object from the image processing device in response to an event notification transmitted to the image processing device, the event notification corresponding to the recognized first gesture; and
based on the object being a setting user interface,
providing on a display of the AR device, while the object is displayed on the screen of the image processing device, a virtual image of the setting user interface corresponding to the object information among prepared virtual images, the virtual image of the setting user interface provided at a first depth layer of the display,
recognizing a second gesture that manipulates a pop-up of the virtual image of the setting user interface to change one or more settings of the setting user interface, and
transmitting, to the image processing device, information that causes the image processing device to change the one or more settings in accordance with the second gesture.

10. The method of claim 9, wherein the providing the virtual image corresponding to the object information comprises, based on types of objects are being different from each other, providing a plurality of virtual images to different depth layers.

11. The method of claim 9, wherein the providing the virtual image corresponding to the object information comprises:

based on the object being media content, providing a virtual image of the media content to a second depth layer.

12. The method of claim 9, wherein the object information comprises identification information of the object and data information, and
wherein the providing the virtual image corresponding to the object information comprises reflecting the data information in a virtual image corresponding to the identification information among the prepared virtual images and providing the virtual image corresponding to the identification information a depth layer of the display.

13. A non-transitory computer-readable recording medium for storing computer readable program code or instructions which are executable by a processor to perform a method, the method comprising:
transmitting gaze coordinates corresponding to an object based on gaze information to an image processing device that is external to the AR device and displays the object on a screen of the image processing device, wherein the gaze coordinates are correlated with screen coordinates of the object displayed on the screen, wherein a visual effect is applied to the screen coordinates of the object displayed on the screen;
recognizing, in a state in which the visual effect is applied to the screen coordinates of the object displayed on the screen, a first gesture to call a virtual image of the object displayed on the screen of the image processing device;
receiving object information of the object from the image processing device in response to an event notification transmitted to the image processing device, the event notification corresponding to the recognized first gesture; and
based on the object being a setting user interface,
providing on a display of the AR device, while the object is displayed on the screen of the image processing device, a virtual image of the setting user interface corresponding to the object information among prepared virtual images, the virtual image of the setting user interface provided at a first depth layer of the display,
recognizing a second gesture that manipulates a pop-up of the virtual image of the setting user interface to change one or more settings of the setting user interface, and
transmitting, to the image processing device, information that causes the image processing device to change the one or more settings in accordance with the second gesture.

14. The non-transitory computer-readable recording medium of claim 13, wherein the providing the virtual image corresponding to the object information comprises:
based on a type of at least a first specified object being different from a type of at least a second specified object, providing a plurality of virtual images to different depth layers.

15. The non-transitory computer-readable recording medium of claim 13, wherein the providing the virtual image corresponding to the object information comprises:
based on the object being media content, providing a virtual image of the media content to a second depth layer.

16. The non-transitory computer-readable recording medium of claim 13, wherein the object information comprises identification information of the object and data information, and
wherein the providing the virtual image corresponding to the object information comprises reflecting the data information in a virtual image corresponding to the identification information among the prepared virtual images and providing the virtual image corresponding to the identification information at a depth layer of the display.

* * * * *